(12) United States Patent
Takato

(10) Patent No.: US 7,506,607 B2
(45) Date of Patent: Mar. 24, 2009

(54) INSTRUMENT CLUSTER DISPLAY

(75) Inventor: Kenichi Takato, Rochester Hills, MI (US)

(73) Assignee: Continential Automotive Systems US, Inc., Auburn Hills, MI (US)

( * ) Notice: Subject to any disclaimer, the term of this patent is extended or adjusted under 35 U.S.C. 154(b) by 54 days.

(21) Appl. No.: 11/650,810

(22) Filed: Jan. 8, 2007

(65) Prior Publication Data

US 2007/0157869 A1 Jul. 12, 2007

Related U.S. Application Data

(60) Provisional application No. 60/758,252, filed on Jan. 11, 2006.

(51) Int. Cl.
| | |
|---|---|
| G01D 7/04 | (2006.01) |
| G01D 11/24 | (2006.01) |
| G01D 11/28 | (2006.01) |

(52) U.S. Cl. .................. 116/301; 116/62.4; 116/286; 362/29

(58) Field of Classification Search .............. 116/62.1, 116/62.4, 286, 287, 288, 300, 301, DIG. 5, 116/DIG. 6, DIG. 36; 362/23, 28, 29, 30
See application file for complete search history.

(56) References Cited

U.S. PATENT DOCUMENTS

| | | | | |
|---|---|---|---|---|
| 3,930,459 | A | * | 1/1976 | Barrow .......................... 116/2 |
| 4,194,587 | A | * | 3/1980 | Shino et al. .................... 180/90 |
| 6,557,485 | B1 | | 5/2003 | Sauter |
| 6,585,385 | B2 | * | 7/2003 | Nakagawa et al. ............ 362/23 |
| 6,642,850 | B1 | * | 11/2003 | Noll et al. ................. 340/815.4 |
| 6,915,758 | B2 | * | 7/2005 | Nakagawa et al. .......... 116/286 |
| 2004/0173025 | A1 | | 9/2004 | Hildebrand et al. | |

FOREIGN PATENT DOCUMENTS

| | | | |
|---|---|---|---|
| DE | 19927462 A1 | * | 12/2000 |
| JP | 08159815 A | * | 6/1996 |
| JP | 2003344118 A | * | 12/2003 |
| JP | 2004219210 A | * | 8/2004 |
| JP | 2004233241 A | * | 8/2004 |
| JP | 2005274438 A | * | 10/2005 |
| WO | 0192047 A1 | | 12/2001 |

OTHER PUBLICATIONS

International Search Report and Written Opinion dated Oct. 1, 2007.

* cited by examiner

*Primary Examiner*—R. A. Smith

(57) ABSTRACT

A dial gauge assembly includes a first pointer driven by a first motor and a second pointer that is driven by a second motor that rotates independently about a common axis. A first pointer rotates about an axis of rotation to indicate on the outer scale and a second pointer rotates about the same axis of rotation to indicate on the inner scale. The first pointer is mounted directly to a shaft of the first motor and the second pointer is mounted directly to a second shaft of the second motor.

15 Claims, 4 Drawing Sheets

INSTRUMENT CLUSTER DISPLAY

CROSS REFERENCE TO RELATED APPLICATION

The application claims priority to U.S. Provisional Application No. 60/758,252 which was filed on Jan. 11, 2006.

BACKGROUND OF THE INVENTION

This invention generally relates to an instrument cluster display. More particularly this invention relates to an instrument cluster display for an automobile that includes more than one pointer movable about a common axis.

An instrument cluster for a motor vehicle includes a dial with a scale indicative of a vehicle performance or operational parameter. A pointer is rotated about a central axis to point to a specific indicator on the dial to communicate the current state of the measured parameter. The basic configuration of an instrument cluster is modified to provide a desired aesthetic appearance to the interior of a vehicle. Because the instrument cluster is an integral part of vehicle operation, automotive manufactures continually update and improve the appearance of the vehicle instrumentation.

One variation of the basic instrument dial is the placement of more than one pointer along a common axis. Such a dial configuration may include an inner scale and an outer scale. An inner pointer rotates to indicate on the inner scale and an outer pointer rotates independent of the first pointer to rotate and indicate on the outer scale. Each pointer is rotated by a separate motor.

Disadvantageously, both motors cannot be disposed along the common axis. Therefore one of the motors is offset from the axis and a transmission mechanism such as a gear train is utilized to drive rotation of at least one of the pointers. The gear train complicates manufacture. Further, friction or misalignment in the gear train can cause skipping, jerking and other undesirable movements of the pointer that are undesirable.

Accordingly, it is desirable to design and develop an instrument cluster assembly that includes multiple pointers that rotate independently about a common axis without requiring complex drive mechanisms.

SUMMARY OF THE INVENTION

An example dial gauge assembly includes a first pointer driven by a first motor and a second pointer that is driven by a second motor that rotates independently about a common axis The dial gauge assembly includes an outer scale and an inner scale. A first pointer rotates about an axis of rotation to indicate a current vehicle condition or parameter on the outer scale and a second pointer rotates about the same axis of rotation to indicate on the inner scale. The first motor includes a first shaft that is disposed along the axis. The first pointer is mounted directly to the first shaft and is rotated about the axis to indicate on the outer scale. A second motor is mounted above the first pointer and includes a second shaft that is also disposed along the axis. The second pointer is mounted directly to the second shaft for rotation about the axis to indicate on the inner scale.

A smoked lens is supported by the housing and extends over the first pointer. The smoked lens hides the pointer and dial face disposed underneath when in a non-illuminated condition. A light source is mounted to the main circuit board. A light housing is mounted adjacent the main circuit board to direct light from the light source through the dial face. Once the dial face is illuminated, it becomes visible through the smoked lens.

An auxiliary circuit board is mounted to the smoked lens above and over the first pointer. The second motor is mounted to the auxiliary circuit board. Because the first motor and the second motor are disposed along the axis, no additional gear train or transmission device is required to drive either of the first pointer and the second pointer. Instead, each of the first pointer and the second pointer are driven directly by the corresponding motor shaft, thereby eliminating any additional gear train or transmission device.

Accordingly, the example dial gauge assembly provides multiple pointers that rotate independently about a common axis without requiring complex drive mechanisms.

These and other features of the present invention can be best understood from the following specification and drawings, the following of which is a brief description.

DETAILED DESCRIPTION OF THE PREFERRED EMBODIMENT

Figure 1:
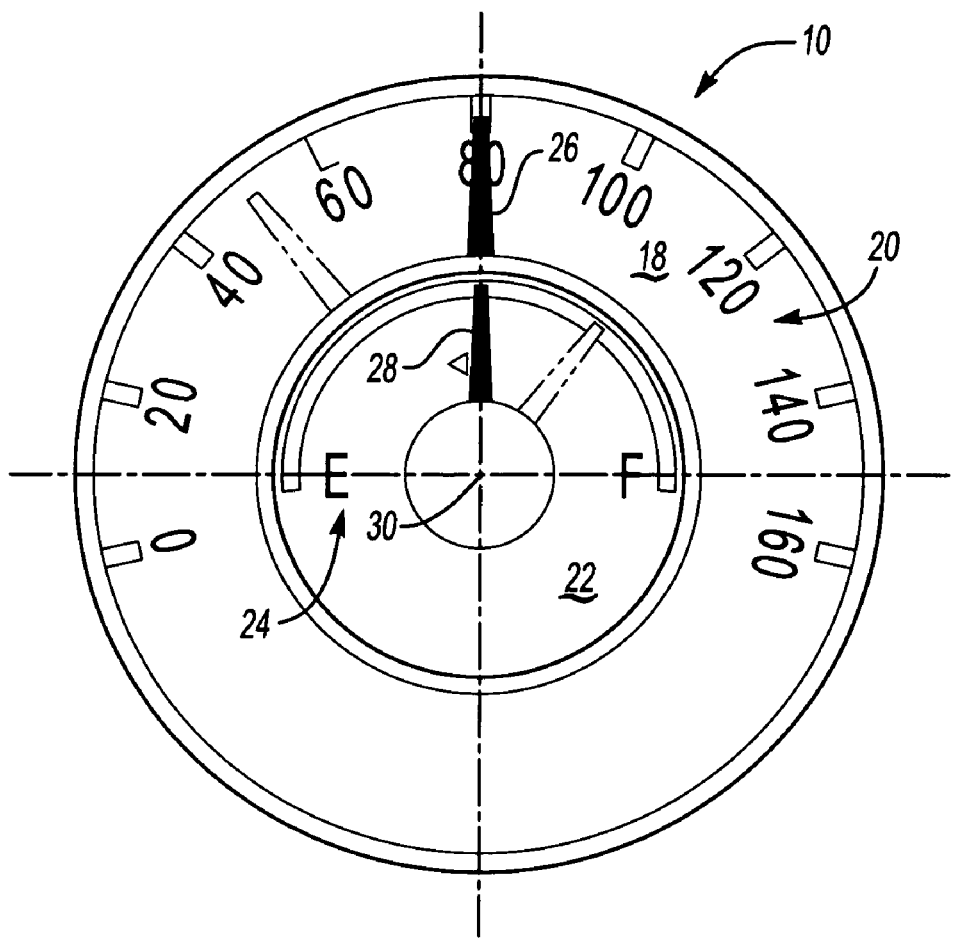
FIG. 1 is a front view of an example instrument cluster assembly.

Referring to FIG. 1, a dial gauge assembly 10 includes a first dial face 18 with an outer scale 20 and a second dial face 22 with an inner scale 24. A first pointer 26 rotates about an axis of rotation 30 to indicate a current vehicle condition or parameter on the outer scale 20. A second pointer 28 rotates about the same axis of rotation 30 to indicate on the inner scale 24. The example outer scale 20 communicates vehicle speed, while the example inner scale communicates a fuel level. The example inner and outer scales 20, 24 are but one of many different combinations of scales that can be provided to communicate desired information.

Figure 2:
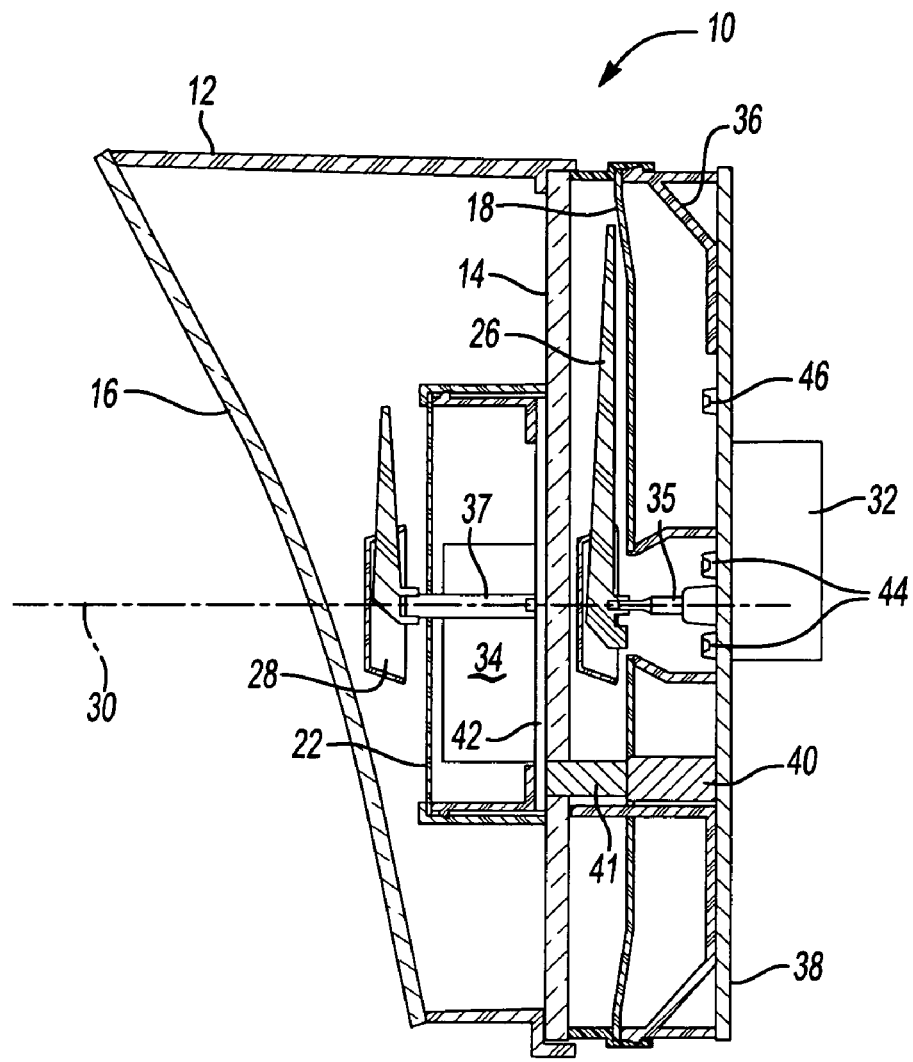
FIG. 2 is a cross-sectional view of the example instrument cluster assembly.

Referring to FIG. 2, the dial gauge assembly 10 includes a housing 12 that supports a clear lens 16 for protecting the moving components. A first motor 32 is mounted to a main circuit board 38. The first motor includes a first shaft 35 that is disposed along the axis 30. The first pointer 26 is mounted directly to the first shaft 35 and is rotated about the axis 30 to indicate on the outer scale 20.

A second motor 34 is mounted above the first pointer 26 and includes a second shaft 37 that is also disposed along the axis 30. The second pointer 28 is mounted directly to the second shaft 37 for rotation about the axis 30 to indicate on the inner scale 24. The example first motor 32 and the example second motor 34 are stepper motors to provide calibrated and controlled movement of the corresponding pointers. Although the example disclosed motors are stepper motors, other known electrically controlled motors could also be utilized.

A smoked lens 14 is supported by the housing 12 and extends over the first pointer 26. The smoked lens 14 hides the pointer 26 and dial face 18 disposed underneath when in a non-illuminated condition. A light source 46 is mounted to the main circuit board 38. The example light source is an LED, however other light sources could also be utilized. A light housing 36 is mounted adjacent the main circuit board 38 to direct light from the light source through the dial face 18. The dial face 18 includes transparent portions that provide for the transmission of light. The transparent portions can include specific portions of the outer scale 22 along with other features that are desired to be visible. Once the dial face 18 is illuminated, it becomes visible through the smoked lens 14.

The auxiliary circuit board 42 is mounted to the smoked lens 14 above and over the first pointer 26. The second motor 34 is mounted to the auxiliary circuit board 42. A conducting pin 41 is receives within a socket 40 of the main circuit board to provide electrical communication and control the auxiliary circuit board 10, and thereby the second motor 34. Because the second dial face 22 is not disposed behind the smoked lens 14, it is visible in a non-illuminated condition. The second dial face 22 is constructed to conceal the second motor 34 from view.

Because the first motor 32 and the second motor 34 are disposed along the axis 30, no additional gear train or transmission device is required to drive either of the first pointer 26 and the second pointer 28. Instead, each of the first pointer 26 and the second pointer 28 are driven directly by the corresponding motor shaft, thereby eliminating any additional gear train or transmission device.

Figure 3:
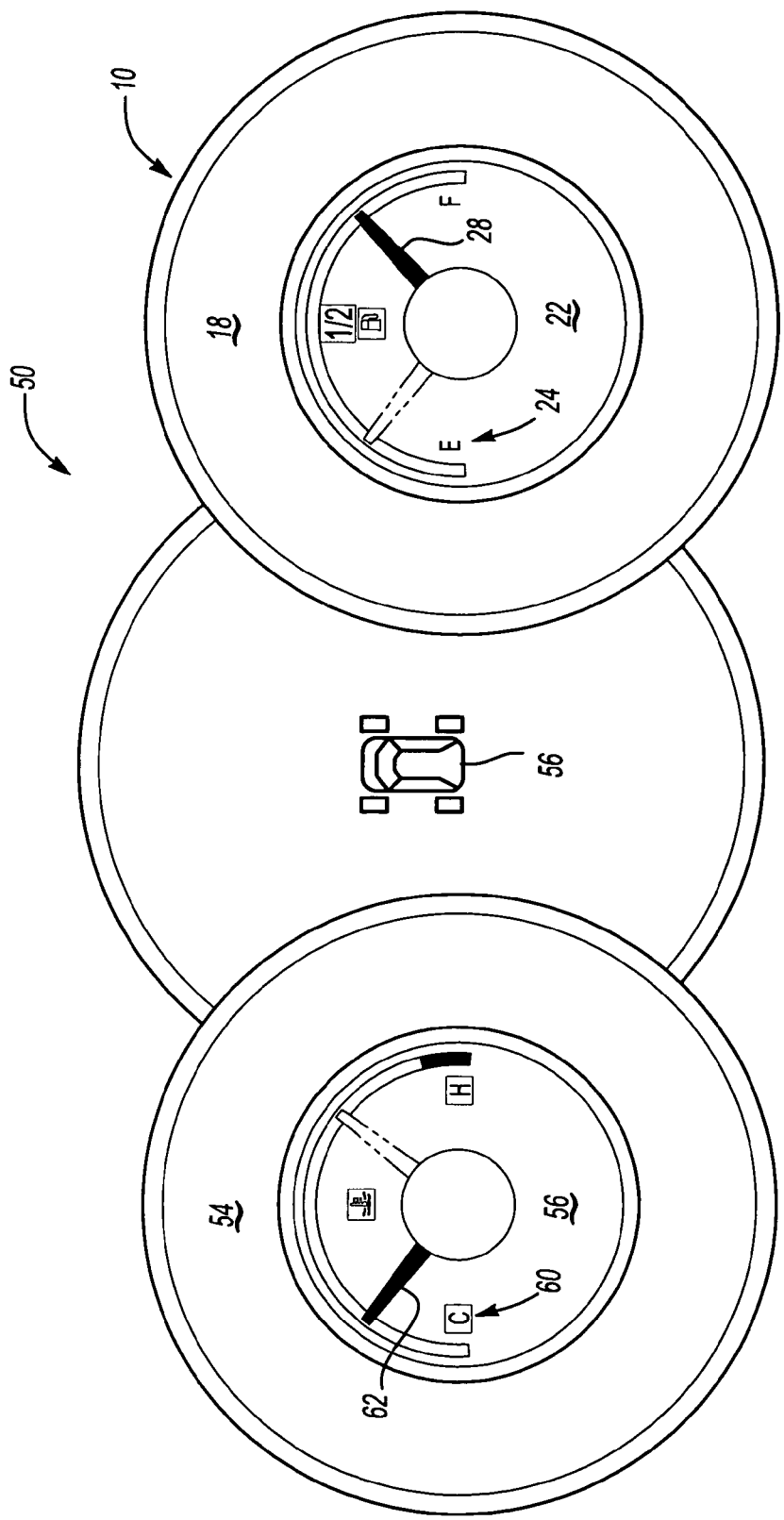
FIG. 3 is a front view of an example instrument cluster assembly in a non-illuminated condition.

Referring to FIG. 3, an example instrument cluster assembly 50 includes the example dial gauge assembly 10 along with a center gauge 52 and a secondary gauge 54. The center gauge 52 and the secondary gauge 54 each include a construction like that of the example dial gauge 10.

The center gauge 52 includes an outer scale 64 (FIG. 4) and an inner vehicle icon 56. The secondary gauge 54 includes an outer scale 68 and an inner scale 60. The example inner scale 60 provides information on coolant temperature that is indicated by a second pointer 62.

A smoked lens covers a first pointer 70 (FIG. 4) of the secondary dial gauge 54. The first pointer 70 is moved by a first motor about a central axis. A second pointer 62 is moved by a second motor that is supported on the smoked lens for rotation about the same central axis as the first pointer 70.

FIG. 3 illustrates the example instrument cluster assembly 50 in a non-illuminated condition. The light sources disposed on the main circuit board that illuminate the outer scale is not on in the non-illuminated condition. Accordingly, the outer scale of each of the dial gauges 10, 52, 54 are not visible.

Figure 4:
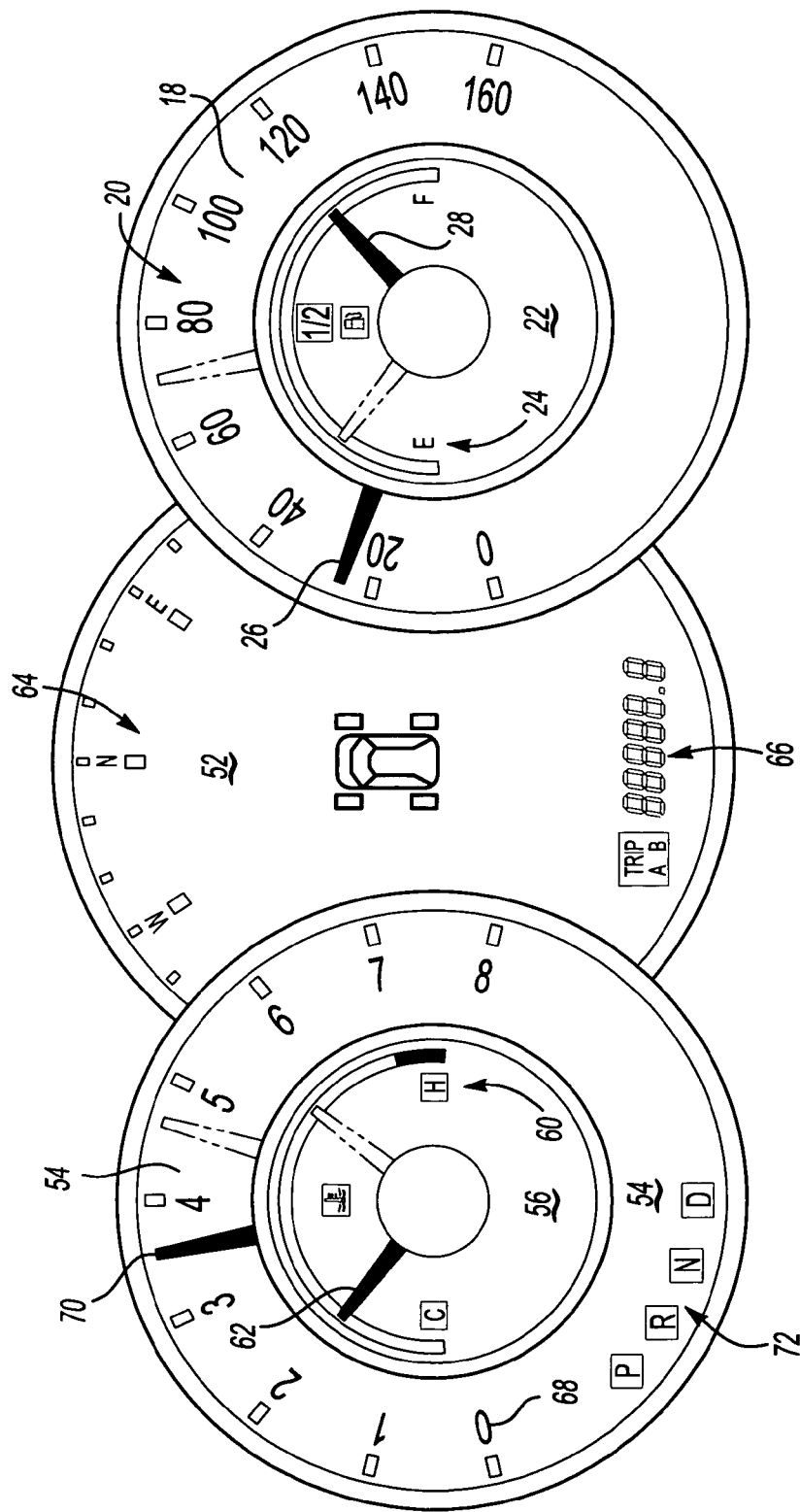
FIG. 4 is a front view of the example instrument cluster assembly in an illuminated condition.

Referring to FIG. 4, in the illuminated condition, the outer scales 20, 64 and 68 are visible through the smoked lens 14. Further, illumination of the dial also includes illumination of the pointers 26 and 70 that are also visible in the illuminated condition. The selective illumination provided by the example instrument cluster assembly 50 provides a desired appearance for communicating information to an operator, and also provides a desired appearance when in a non-illuminated condition.

The example instrument cluster assembly 50 includes the center gauge 52 that provides an inner vehicle icon 56 that is utilized to communicate various conditions of the vehicle. The outer scale 64 provides a compass function and displays a direction or orientation of the vehicle. The example outer scale also includes an odometer 66 for tracking distance driven.

The example secondary gauge 54 includes the outer scale 68 that communicates engine speed. The pointer 70 rotates about an axis common with the pointer 62. The outer scale 68 also includes symbols that are selectively illuminated or otherwise highlighted to indicate the transmission setting. As should be understood, the example instrument cluster assembly 50 includes several different gauges that illustrate common monitored features, other gauges and dials as are utilized for monitoring vehicle or other operating parameters will also benefit from the disclosure of this invention.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An instrument cluster assembly comprising:
    a first dial face including a first scale for indicating a first desired parameter;
    a first pointer rotatable about a central axis;
    a first drive motor including a first shaft supporting the first pointer and disposed along the central axis for driving the first pointer;
    a second dial face including a second scale for indicating a second desired parameter;
    a second pointer rotatable about the central axis for indicating on the second dial face;
    a second drive motor including a second shaft supporting the second pointer and disposed along the central axis for driving the second pointer; and
    a lens disposed between the first dial face and the second dial face, wherein the second drive motor is mounted to the lens.

2. The assembly as recited in claim 1, including a light source for illuminating the first dial face.

3. The assembly as recited in claim 2, wherein the first dial face is visible through the lens when the light source is in an illuminated condition and the first dial face is not visible when the light source is in a non-illuminated condition.

4. The assembly as recited in claim 1, wherein the first drive motor includes a first shaft that is disposed along the central axis and the second drive motor includes a second shaft that is disposed along the central axis.

5. The assembly as recited in claim 4, wherein the first pointer is attached to the first shaft and the second pointer is attached to the second shaft.

6. The assembly as recited in claim 1, including a printed circuit board on which the first drive motor is mounted.

7. The assembly as recited in claim 6, including an electrical connector for connecting the second drive motor to the printed circuit board.

8. The assembly as recited in claim 1, including a light source for illuminating one of the first and second pointer assemblies.

9. The assembly as recited in claim 1, wherein the first scale is of a first diameter and the second scale is of a second diameter that is smaller than the first diameter.

10. The assembly as recited in claim 1, wherein the first drive motor and the second drive motor comprise stepper motors.

11. An instrument cluster assembly comprising:
    a first dial including a first scale and a first pointer assembly rotatable about a central axis;
    a first light source for illuminating the first dial;
    a second dial including a second scale and a second pointer assembly rotatable about the central axis;
    a lens disposed between the first dial and the second dial, wherein the first dial is not visible in a non-illuminated condition and is visible in an illuminated condition;
    a first drive motor with a first shaft that supports the first pointer assembly; and a second drive motor with a second shaft that supports the second pointer assembly, wherein the second drive motor is mounted to the lens.

12. The assembly as recited in claim 11, including a printed circuit board including the first light source and to which the first drive is mounted.

13. The assembly as recited in claim 12, including an electrical connector on the printed circuit board providing an electrical connection between the printed circuit board and the second drive.

14. An instrument cluster assembly comprising:
a first gauge including a first pointer supported for rotation about a common axis on a first shaft of a first motor;
a second gauge including a second pointer supported for rotation about the common axis on a second shaft of a second motor;
a divider disposed between the first gauge and the second gauge, wherein the second motor is mounted to the divider and wherein the divider comprise a lens through which the first gauge is visible.

15. The assembly as recited in claim 14, wherein the first gauge is not visible in a non-illuminated condition and is visible in an illuminated condition.

* * * * *